(12) United States Patent
Vogel (10) Patent No.: US 8,086,980 B2
(45) Date of Patent: Dec. 27, 2011

(54) EFFICIENT POWER REGION CHECKING OF MULTI-SUPPLY VOLTAGE MICROPROCESSORS

(75) Inventor: Dieu Q. Phan Vogel, Fishkill, NY (US)

(73) Assignee: International Business Machines Corporation, Armonk, NY (US)

( * ) Notice: Subject to any disclaimer, the term of this patent is extended or adjusted under 35 U.S.C. 154(b) by 546 days.

(21) Appl. No.: 12/032,276

(22) Filed: Feb. 15, 2008

(65) Prior Publication Data

US 2009/0210835 A1  Aug. 20, 2009

(51) Int. Cl.
*G06F 17/50* (2006.01)
(52) U.S. Cl. ......... 716/111; 716/106; 716/120; 716/127
(58) Field of Classification Search .................. 716/1, 4, 716/8–14, 106, 111, 120, 127; 703/13–22
See application file for complete search history.

(56) References Cited

U.S. PATENT DOCUMENTS

| | | |
|---|---|---|
| 5,581,475 A | 12/1996 | Majors |
| 6,086,628 A | 7/2000 | Dave et al. |
| 6,097,886 A | 8/2000 | Dave et al. |
| 6,112,023 A | 8/2000 | Dave et al. |
| 6,132,109 A | 10/2000 | Gregory et al. |
| 6,230,303 B1 | 5/2001 | Dave |
| 6,305,000 B1 | 10/2001 | Phan et al. |
| 6,349,401 B2 | 2/2002 | Tamaki |
| 6,378,110 B1 | 4/2002 | Ho |
| 6,405,346 B1 | 6/2002 | Nawa |
| 6,675,139 B1 | 1/2004 | Jetton et al. |
| 6,725,439 B1 | 4/2004 | Homsinger et al. |
| 6,944,552 B2 | 9/2005 | Francom et al. |
| 7,016,794 B2 | 3/2006 | Schultz |
| 7,089,129 B2 | 8/2006 | Habitz |
| 7,096,447 B1 | 8/2006 | Li et al. |
| 7,134,099 B2 | 11/2006 | Collins et al. |
| 7,146,303 B2 | 12/2006 | Roy et al. |
| 7,152,216 B2 | 12/2006 | Kapoor et al. |
| 7,240,316 B2 | 7/2007 | Regnier |
| 7,305,369 B2 | 12/2007 | Floyd |
| 7,480,842 B1 * | 1/2009 | Young et al. .................. 714/725 |
| 2001/0015464 A1 | 8/2001 | Tamaki |
| 2002/0112212 A1 * | 8/2002 | Cohn et al. ........................ 716/1 |
| 2004/0078767 A1 | 4/2004 | Burks et al. |
| 2004/0172232 A1 | 9/2004 | Roy et al. |
| 2005/0102644 A1 | 5/2005 | Collins et al. |
| 2005/0210430 A1 | 9/2005 | Keller et al. |
| 2005/0278676 A1 | 12/2005 | Dhanwada et al. |
| 2006/0085770 A1 | 4/2006 | Kapoor et al. |
| 2006/0184905 A1 | 8/2006 | Floyd et al. |
| 2006/0265681 A1 * | 11/2006 | Bakir et al. ..................... 716/10 |
| 2007/0094630 A1 * | 4/2007 | Bhooshan ....................... 716/13 |
| 2008/0127020 A1 | 5/2008 | Rittman |
| 2008/0141196 A1 | 6/2008 | Ohshima et al. |
| 2009/0210835 A1 | 8/2009 | Phan Vogel |

OTHER PUBLICATIONS

"Algorithm to Share Physical Processors to Maximize Processor Cache Usage and Topologies", filed Jan. 11, 2008. U.S. Appl. No. 12/032,417, Office Action mailed Aug. 19, 2010.
U.S. Appl. No. 12/032,417, Notice of Allowance mailed Feb. 9, 2011.
U.S. Appl. No. 11/055,863, Office Action mailed Apr. 5, 2007.
U.S. Appl. No. 11/055,863, Notice of Allowance mailed Jul. 30, 2007.

* cited by examiner

*Primary Examiner* — Vuthe Siek
(74) *Attorney, Agent, or Firm* — William A. Kinnaman, Jr.

(57) ABSTRACT

A improved method for very-early validation of voltage region physical power distribution networks uses initial floor plan and early power grid data to identify physical power connection problems associated with voltage regions defined in multi-supply voltage microprocessor chip designs. Since all checking algorithms are floor plan-based and do not require complete circuit data, they are executable very early in the design phase. As a result, power region-related problems can be resolved much sooner than by using conventional full-chip physical design checking and power grid analysis methods.

20 Claims, 8 Drawing Sheets

EFFICIENT POWER REGION CHECKING OF MULTI-SUPPLY VOLTAGE MICROPROCESSORS

RELATED PATENTS AND APPLICATIONS

U.S. patent application, Ser. No. 11/055,863 filed on Feb. 11, 2005 and now U.S. Pat. No. 7,305,639, entitled "Method and Apparatus for Specifying Multiple Voltage Domains and Validating Physical Implementation and Interconnection in a Processor Chip. The material in this application is hereby incorporated by reference.

U.S. patent application Ser. No. 12/032,417 filed on even date herewith and entitled "Automated Method and Apparatus for Very Early Validation of Chip Power Distribution Networks in Semiconductor Chip Design". The material in this application is hereby incorporated by reference.

TRADEMARKS

IBM® is a registered trademark of International Business Machines Corporation, Armonk, N.Y., U.S.A. Other names used herein may be registered trademarks, trademarks or product names of International Business Machines Corporation or other companies.

FIELD OF THE INVENTION

The invention relates to multi-supply voltage semiconductor chip design. In particular, the invention relates to a very-early physical design checking method used for validating voltage region power distribution networks of multi-supply voltage microprocessors. More specifically, the invention relates to voltage-region power-distribution validation techniques that make use of early chip floor plan and power grid data to detect real physical power connection errors associated with voltage region designs.

BACKGROUND OF THE INVENTION

Multi-supply voltage semiconductor chip designs support several frequency and power saving requirements for different applications. Voltage regions can be defined strategically for these designs to help efficiently manage both performance and power distribution criteria while satisfying all other chip floor plan constraints.

Voltage regions on the semiconductor chip are powered independently and their circuit compositions must meet both timing and power distribution goals. Complex multi-power domain regions allow sharing of different circuit domains in the same chip area in order to satisfy these design goals without sacrificing chip area.

Voltage region power distribution networks are usually created by the same algorithmic power router used for the full-chip power grid. Advanced chip power routing methodology supports usage of nested voltage regions in complex chip designs. Examples of such complex designs involve those with overlapping global infrastructure components such as the global clock distribution network, which may require that clock circuitry of a different power domain be placed within a region supporting circuits of a totally different domain. Level-translator regions are another example in which very tiny circuits involving multiple domains (e.g., VDD and VIO) are embedded within a much larger region of the predominant power domain (e.g., VIO). These nested regions are more susceptible to power connection problems than other independent voltage regions. This is because the quality of their power distribution networks depends not only on the quality of the routing specifications defined for these regions, but also on the quality of the parent power distribution networks.

Definitions of voltage regions and their physical power networks not only have to enable effective intermixing of different circuit domains, but also efficient power distribution of applicable domains to all circuits placed within. New multi-supply voltage chip designs, especially those with a large number of circuits placed at the chip-level floor plan, use computer-aided programs to achieve the above voltage region design goals. These chip designs typically depend on usage of conventional full-chip physical design checking processes to validate the full-chip physical power distribution network. These include layout-versus-schematic (LVS) checking, design rule checking (DRC), and power grid analysis used for chip electromigration and IR-drop analysis. Partial checking of just the voltage region networks is not feasible with these methods.

As a chip floor plan evolves over time to support various required design changes, power connection problems may arise for previously defined power regions and circuits placed within them. Unfortunately, such issues typically are not identified until full chip physical design checks are performed. As is the case of the above identified application, Ser. No. 11/055,863, full-chip checking processes are usually performed late in the design phase since they require more complete circuit electrical power and physical layout data. When the full-chip checking jobs finish, additional analysis is typically involved in order to isolate region power distribution network problems from other power-related problems. In design environments where full chip checking capability for multi-voltage chip designs may still be limited, such issues may even go undetected until actual hardware deployment.

SUMMARY OF THE INVENTION

In accordance with the present invention, a method and computer program product for performing the method are provided for validating a physical implementation of voltage region power distribution networks in a semiconductor chip design. In accordance with the claimed method, one or more steps of which are performed by a computer, a plurality of early chip design steps are performed resulting in an early semiconductor chip design including an initial chip floor plan and a chip power grid layout. A series of early power grid validity checks are performed on the power distribution networks after the early chip design steps by using routing properties coded on region shapes for quick identification of voltage regions and their expected power metallurgy characteristics, analyzing region power distribution networks against the chip floor plan, which contains circuit abstracts rather than real circuit layouts, and using coded connectivity attributes already existing in the chip power grid layout and the chip floor plan, eliminating a need to build a full logical representation of a complete power metallurgy and via structure as required by conventional chip physical design checking methods. A series of post early power grid validity checks are performed on aspects of the chip design other than power distribution networks, including chip signal routing steps. Finally, full-chip formal and physical design verification and analysis procedures are performed after completion of all mentioned steps and checks.

These checks preferably occur as soon as a chip power grid is built and includes defined region power distribution networks. This is feasible because the checks make use of information already available at that point in the design process not only from the built power grid, but also in the initial chip floor plan. The information available from the floor plan includes placed abstracts generated using circuit libraries and global chip layouts, network interconnections generated using circuit design software, and region shapes identifying independently powered areas on the chip. Process steps such as clock optimization, global infrastructure checks and chip signal routing can follow the use of a test set containing the early power region checks. Post design full chip design checks follow all mentioned design and check steps. The results from the post design checks along with the results from the early power checks are fed back to preceding process and checks steps to correct design chip faults. Thus, power grid faults resulting from post early power check steps are corrected by the early power check test set.

The early power region checks (EPRC) is an toolset developed to automatically identify physical power connection problems associated with voltage islands. This toolset includes several power connectivity checking utilities that focus on validating the physical implementation of power grid inside voltage regions. These utilities make use of power net connectivity attributes that already exist for metal shapes representing the chip power grid. They also utilize annotated region shape properties present in the floor plan. For problems associated with circuit macros placed inside voltage regions, macro power pin connectivity attributes already defined in the floor plan are also used. Because macro abstract information is used instead of actual layouts, these checking utilities flag macro-related region power shorts and opens faster than conventional chip LVS checks.

Examples of utilities written to focus on detecting common power opens or shorts within voltage regions include the following:

a. Power Region Continuity Check

This check detects any voltage island that is disconnected from the next higher level of the full chip power grid. A region may be defined as a sub-region within another region or just a region on the chip. This check uses the annotated metal routing layers of power region shapes to determine the highest metal expected to be assigned for regions. It then checks this layer for continuity with the next higher level of metal expected to be available in a parent region.

b. Macro Power Continuity Check

This check flags any custom macros for potential power opens within a power region. It checks the macro's highest power metals for expected connection to the same or next higher level of chip or region power. This check is applicable to independent regions as well as to regions nested within regions. It can identify problems associated with multi-voltage macros as well as single-domain macros. Here a macro's logical power connections and its physical power pin locations are checked against the actual implementation of a region's power planes. For multi-voltage domain macros, proper physical power grid connections are checked for all associated power planes.

c. Correct Macro Power Type in Power Regions

This check detects any macro instance that is inadvertently placed in a power region supporting different power planes. It validates the logical connection of macro power pins against the type of power region as defined by that region's shape property.

The EPRC toolset's early checking capabilities can assist with voltage region definitions and optimizations. This is useful for new chip designs, especially those involving a large number of circuits placed at the chip-level floor plan. Evaluations of early experimental region power distribution networks help to fine-tune the region physical attributes, such as location, area, and compositions.

Early validation of region power grids also helps to prevent subsequent real power grid design errors. This is achieved by enabling early fine-tuning of region power routing specifications. Region routing specifications are used by an automated process to create the power metals representing the voltage region distribution networks. These specifications typically include the expected routing metal layers, their power domains, routing patterns (e.g., 1 VDD metal track to every 3 VIO), and routing pitches. This invention makes use of these same region routing specifications to speed up certain types of region power integrity checks.

In controlled engineering-change (EC) design mode, the invention helps to determine the type of change (e.g., which metal layer), if any, is required to correct an existing chip or voltage region power grid should a new power short surface, for instance, due to a change in voltage region composition.

The invention provides mechanisms and algorithms to speed up the identification and early checking of voltage region physical power distribution networks.

To speed up the identification of region power distribution networks, the invention makes use of region properties coded on region shapes. These properties are usually required for routing region power networks. The invention uses these same routing properties to determine the expected region metallurgy characteristics and power domains to speed up certain types of voltage region power open and short checks.

Therefore, the main objective of this invention is to provide an improved chip floor plan design process, with the emphasis on improving the quality of the voltage region definitions and their power distributions.

Another objective of the invention is to enable early checking results and to speed up checking for some supply problems in multi-supply voltage microprocessor, by using early design information that already exists in the chip power grid and the chip floor plan.

A further objective of the invention is to provide mechanisms to quickly identify new region power grid conflicts due to changes in region composition, which includes placement and/or circuit abstract changes.

BRIEF DESCRIPTION OF THE DRAWINGS

The foregoing and other objects, features, and advantages of the present invention are apparent from the following more particular description of the preferred embodiment of the invention, as illustrated in the accompanying drawings of which.

DETAILED DESCRIPTION OF THE INVENTION

Figure 1:
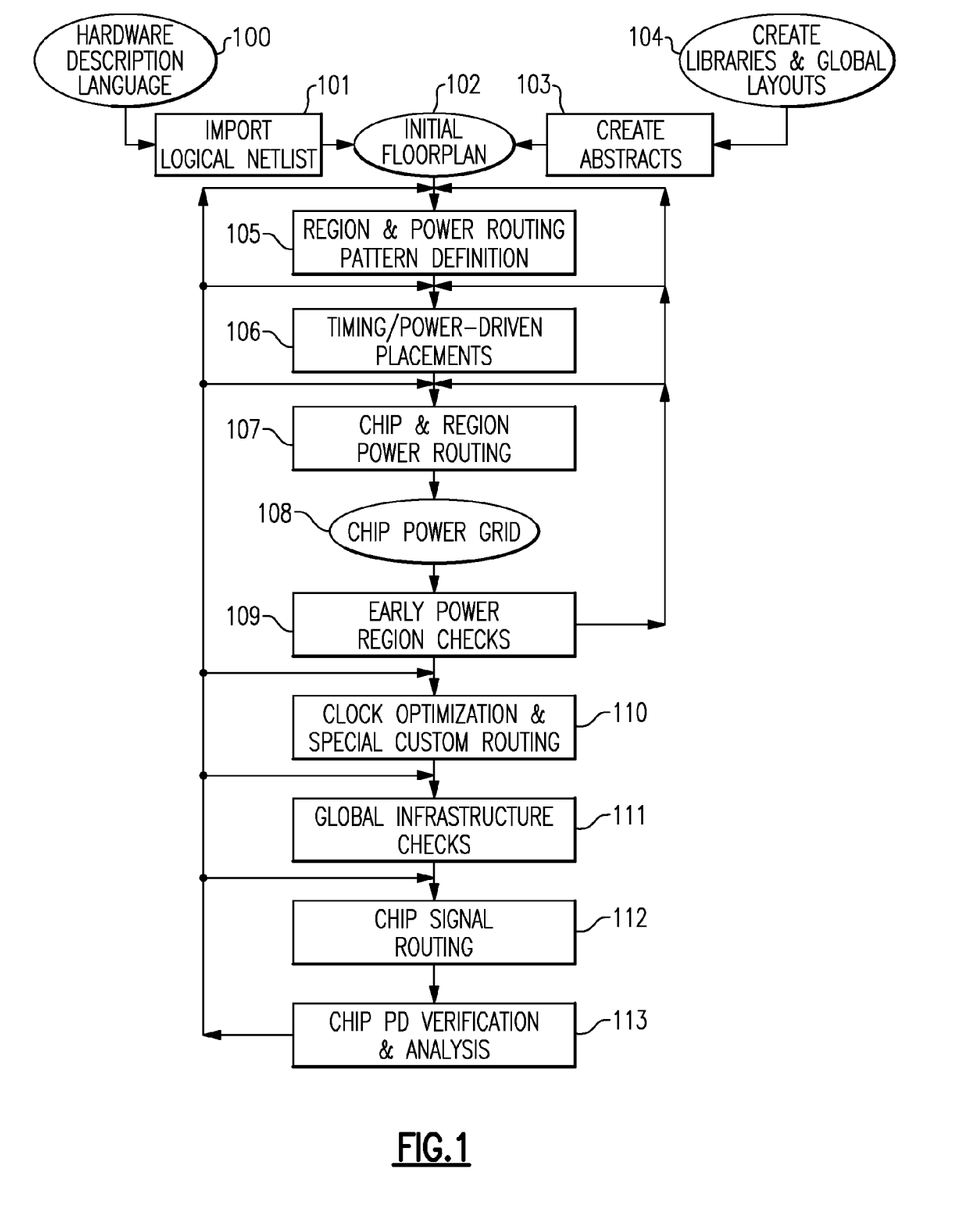
FIG. 1 is a schematic diagram showing how early power region checking in accordance with the present invention is incorporated into a chip physical design process.

Turning now to FIG. 1, before a chip power grid 108 is created, an initial chip floor plan 102 is laid out. Custom abstract macros are created 103 and placed in the chip floor plan 102 using circuit libraries and existing global layouts 104. The floor plan 102 also contains abstract connectivity for the circuits of the floor plan imported 101 from a logical chip description 100. Floor plan power regions are defined 105, and timing-driven placements are implemented 106 to provide a skeleton from which the full-chip power routing process 107 can be used to create the chip power grid layout 108. In accordance with the present invention, after the power routing step, early power region checks 109 are performed. These tests use the early chip floor plan and power grid to detect physical power connection errors associated with voltage region designs. The tasks remaining after the early power region checks include: clock tree synthesis, optimization, and special custom routing 110; global infrastructure checks 111; and routing of chip signals 112. The global infrastructure tests 111 are performed to detect obvious conflicts between implemented chip global components. Routing of all other chip signals 112 is done after all the global infrastructure components, or their contract representations, are in place.

With a routed chip layout finally available, full-chip formal and physical design verifications 113 are performed before the design cycle is declared complete. Full-chip physical design verifications typically include layout-versus-schematic (LVS) checking, design rule checking (DRC), and missing-power-via methodology checks (NMC), plus full-chip power grid analysis (PGA) and global signal noise analysis (GSNA). Chip power grid design errors are typically not detected until these final full-chip physical design checks are performed. By introducing the EPRC toolset 109 into the typical chip design flow as shown in FIG. 1, voltage region power grid design errors can be detected much earlier for correction. Usage of this invention is especially beneficial to the early chip floor planning process, in particular, the optimization of voltage region definitions. Continuous evaluations of early voltage region power distribution networks help to fine-tune the region boundaries, their circuit compositions as well as their power routing patterns.

As shown in FIG. 1, errors detected by the early power region checks 109 and the chip physical design and analysis 113 are fed back to previous stages for correction. As a result, errors detected by the chip physical design variation and analysis will be checked by the early power region checks.

Figure 2:
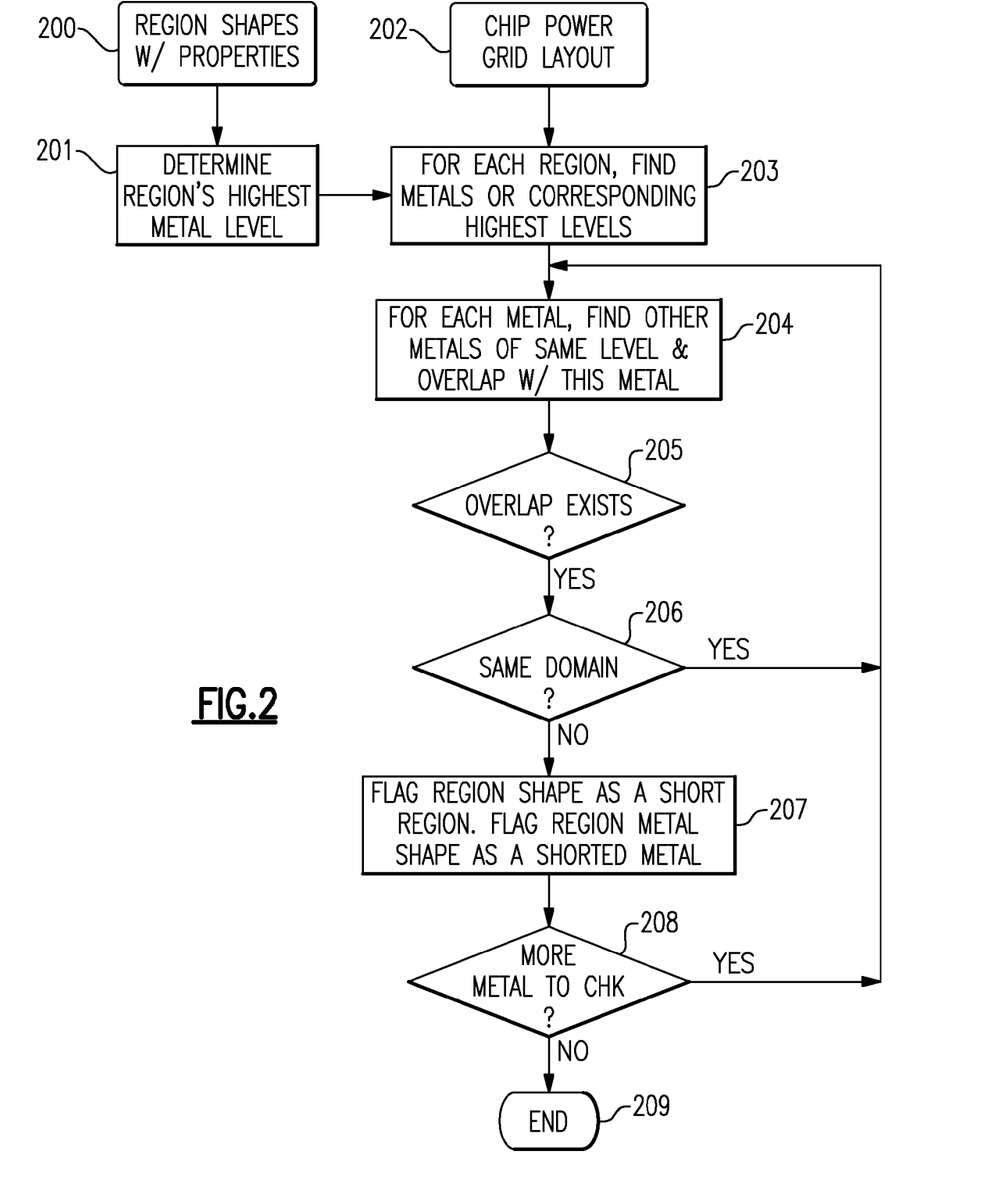
FIG. 2 is a flow diagram of an early power region checking program to detect shorts for a power region's highest level of power metal.

Turning now to FIG. 2, this flowchart illustrates a quick checking method, which detects a power region short that usually occurs due to conflicting definitions of region areas and/or power routing patterns. Based on properties already coded on region shapes 200, the program determines the regions' highest levels of metal 201. From the full-chip power grid 202, the program identifies locations of defined voltage regions 203. For each voltage region, the program allocates metals of the identified region's highest level 204. For each identified metal of the region-under-test, find other overlapping metals of the same level 205. If any such overlapping metal exists, check power connectivity of the overlapping metal 206. If connectivity of the overlapping metal is different from the region's metal-under-test, the program flags the region's metal shape as a short and the region shape as a region having power shorts 207. The check repeats for all metals found in this region on its expected highest level of routing layer 208.

Figure 3:
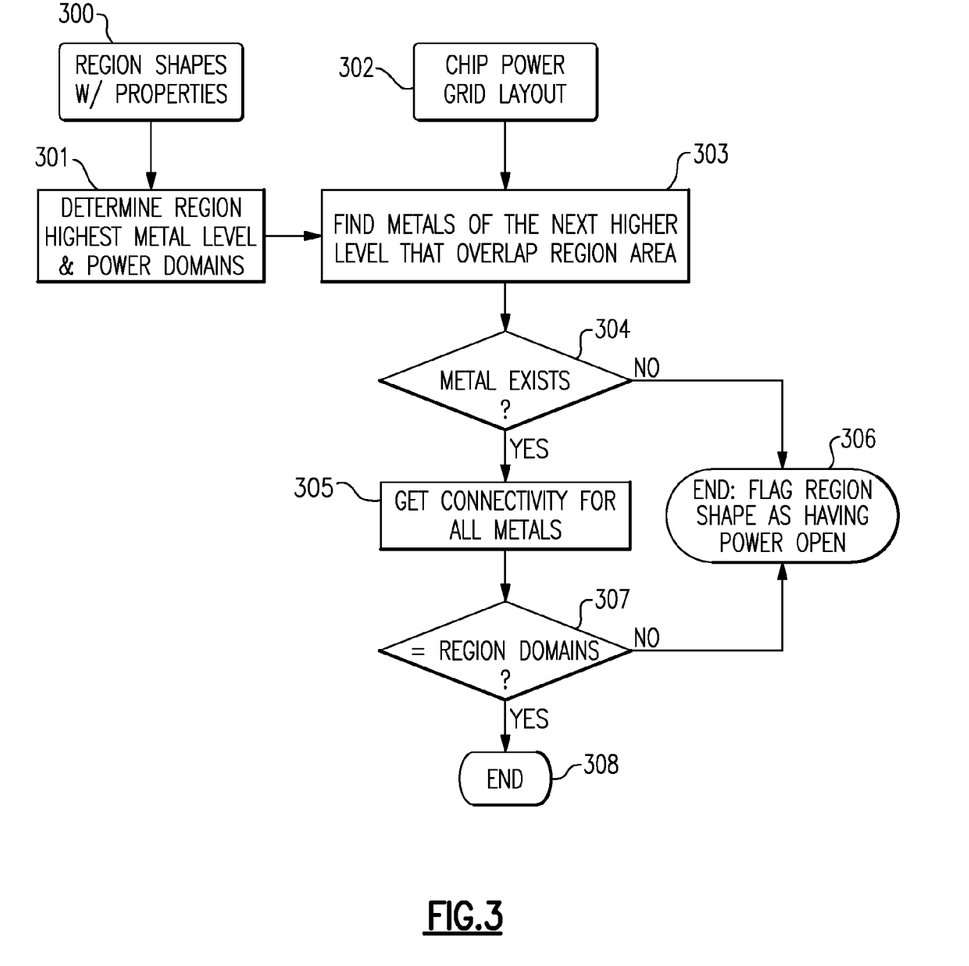
FIG. 3 is a flow diagram of one example of a power region continuity checking utility for use as an early power region check program to detect power regions that are disconnected from the next higher level of metal.

FIG. 3 illustrates a preferred quick power region continuity check, which detects a common type of uncovered (i.e., unconnected or open) power region due to missing power connections between the region's power grid and its parent power distribution network. Similar to FIG. 2, region shapes and properties 300 are used to determine the region's highest metal level and their associated power domains 301. From the full-chip power grid 302, region metals of the identified highest level are found 303. If none is found 304, the region is flagged as an open 307 (as this type of problem is likely due to outdated power distribution network versus its defined routing specification). If highest region metals are found, unique metal connectivity information is extracted from the allocated metals 305, and compared 306 against the list of power domains already derived from region properties for each expected region metal level 301. If a mismatch is found, the region shape is flagged as having power open 307.

Figure 4:
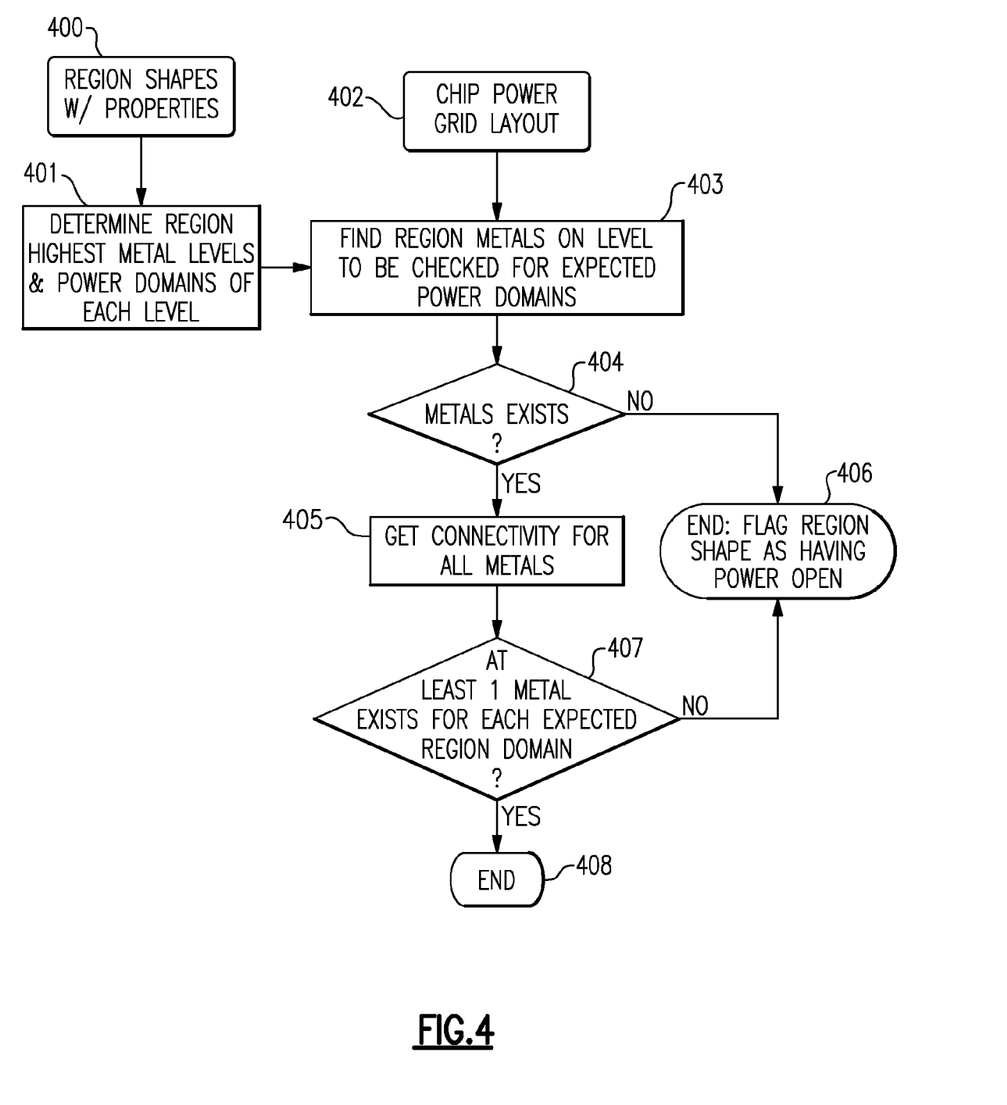
FIG. 4 is a flow diagram for one example of a quick power region continuity checking utility for use as an early power region checking program to detect power regions that are disconnected from an expected voltage supply on a certain region's metal level.

FIG. 4 illustrates a preferred quick power region continuity check, which detects a flagrant type of uncovered power region due to a missing power supply in the implemented physical region power distribution networks. This type of error is usually due to obsolete power grid data or to conflicting region specifications. Similar to previous examples, region shapes and properties 400 are used to determine metal levels expected for each region and power domains for each of these levels 401. From the full-chip power grid 402, for each identified region's metal level, the program allocates metals of that level 403. If none is found 404, the region is flagged as an error 407 on that metal level against its routing specifications. If region metals are found, their metal connectivity is checked 405. For each expected power domain of that metal level, at least one metal must exist with its connectivity matching the expected region domain 406. If no metal is found with connectivity matching an expected region domain, the region shape is identified as having power open 407.

Figure 5:
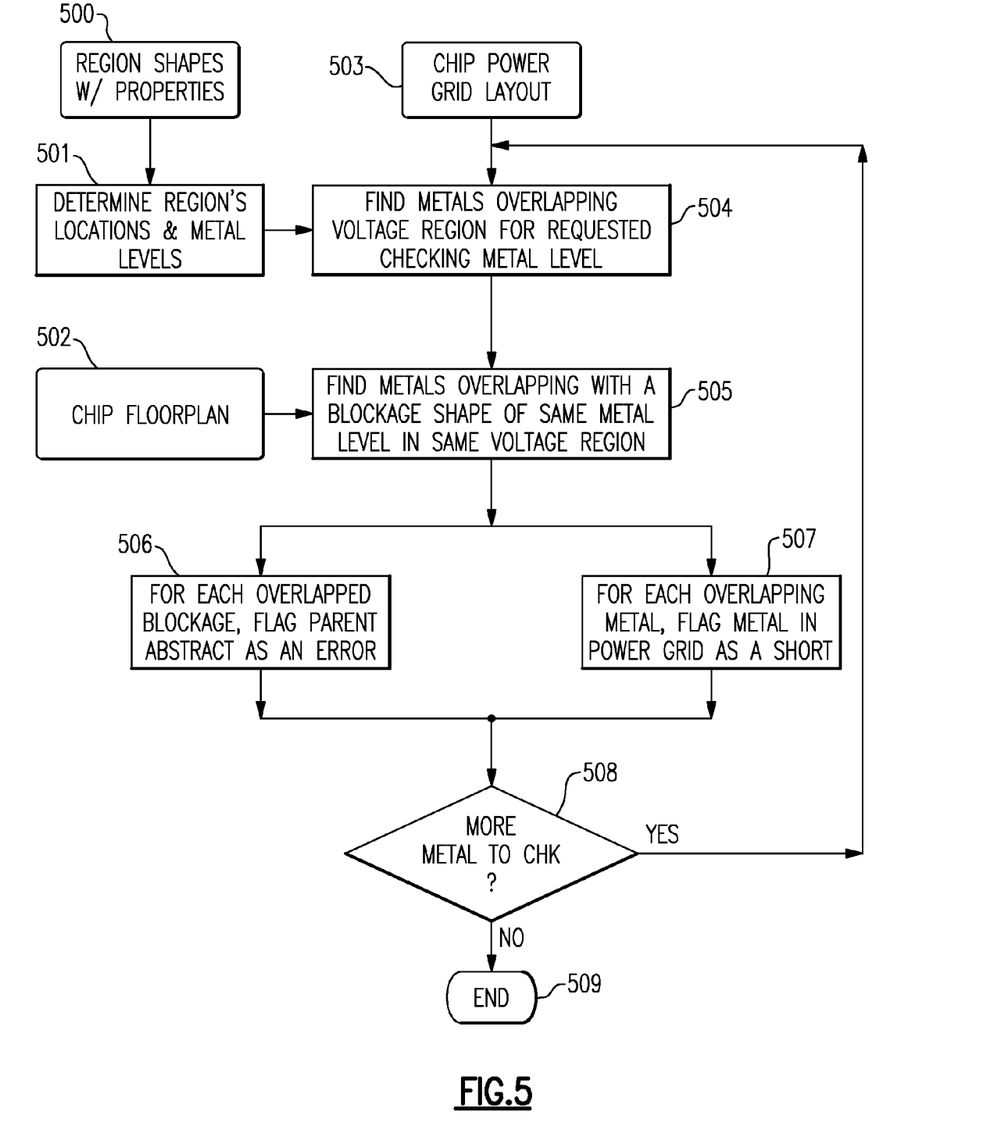
FIGS. 5 and 6 are flow diagrams of power short checking utilities for use as an early power region checking program to detect a region power metal shorting to a macro's metal and to a macro's pin inside voltage regions.
Figure 6:
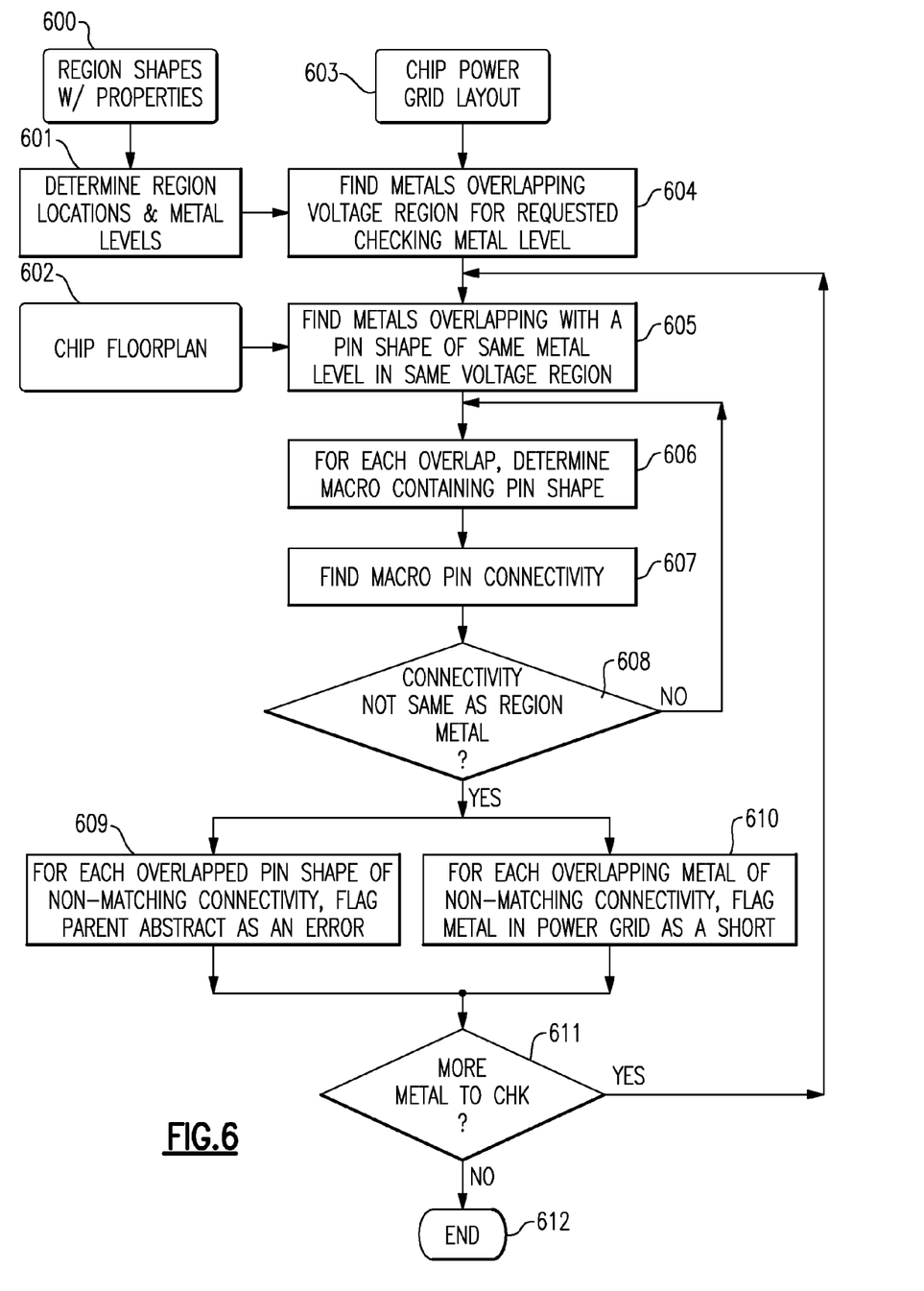

FIG. 5 and FIG. 6 illustrate power short checks, which detect a region power metal shorting, respectively, to a macro's metal blockage and to a macro's pin inside voltage regions. In both flowcharts, region shapes 500 and 600 are used to determine the locations of the corresponding voltage region power distribution networks 503 and 603 in the full-chip power grid 502 and 602. For each requested checking metal level, using the chip floor plan, which contains circuit abstract placements and connectivity as an input 501 and 601, the program finds metals overlapping, respectively, either with a circuit's blockage shape of the same metal 504, or with a circuit's pin shape of the same metal 604. As depicted in FIG. 5, if a region metal overlapping a circuit's macro blockage is found 505, both the region shape and region metal are flagged as having an error and power short 506 and 507. For power shorting with circuit's pins, FIG. 6 shows that macro pin connectivity 606 also has to be obtained from the floor plan and checked against the region's metal connectivity 607. If connectivity mismatches exist, the circuit macro whose pins are shorting with the region's metal is flagged as an error 608. Similarly, the macro's region shape is also flagged as having and error and macro power shorts within 609 and 610.

Both processes end 509 and 612 when there is no more metal to check 508 and 611.

Figure 7:
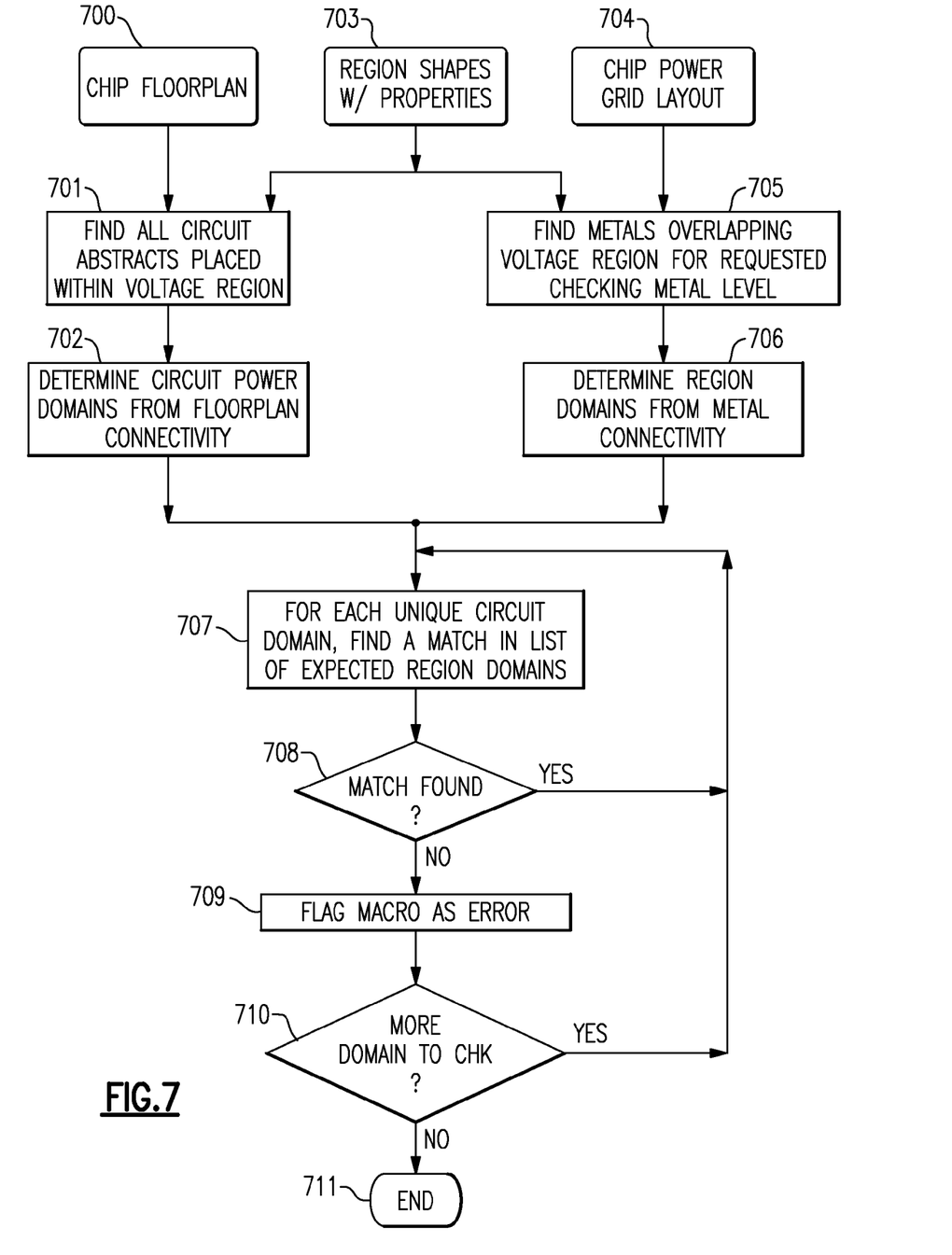
FIG. 7 is a flow diagram of one example of a macro-related power continuity checking utility for use as an early power region check program to identify all macros that are placed within a voltage region but will not have any connection with the parent power distribution network.

FIG. 7 illustrates a power region continuity check, which identifies uncovered macro power distribution networks by comparing circuit power domains against the region power domains using data in the chip floor plan 700 and chip power grid layout 704. For all circuits that are placed inside a voltage region 701, circuit power domains can be derived from actual macro pin connectivity 703 and 705 already existing in the floor plan 700. For all voltage regions being checked, region power domains are determined as depicted in FIG. 7 based on region metal connectivity 706. Alternately, this information can also be quickly determined based on properties coded on corresponding region shape 703. If a mismatch 708 is found between a macro's power domain 702 and the region's power domains 706, both the macro abstracts and the corresponding region shape are flagged as errors 709. The process ends 711 when there are no more domains to check 710.

Figure 8:
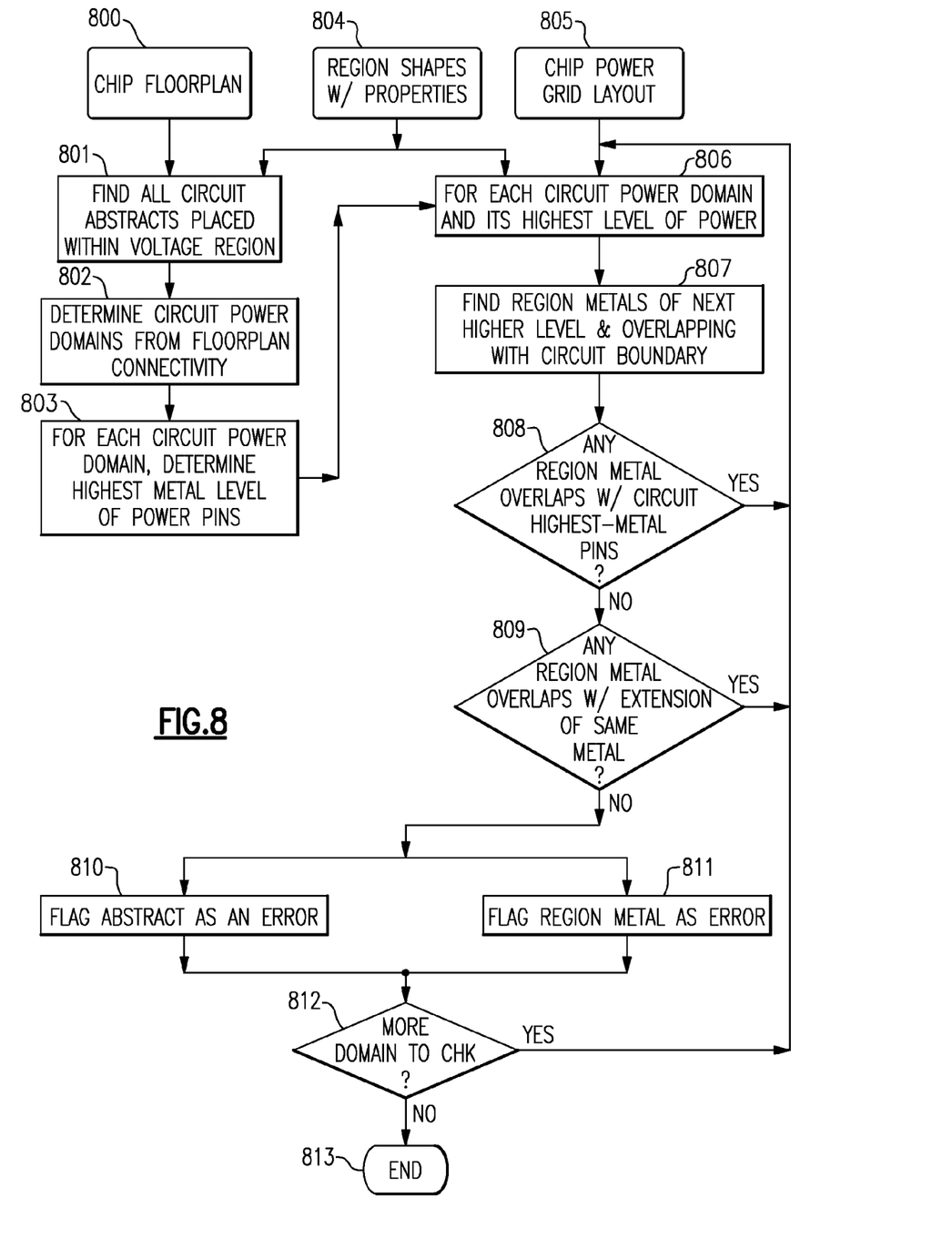
FIG. 8 is a flow diagram of one example of a power region continuity checking utility for use as an early power region check program to detect power opens that exist in circuits placed inside voltage regions.

FIG. 8 illustrates a power region continuity check, which identifies uncovered macro power distribution networks by checking a circuit abstract's highest level of power metals for minimum connection with its parent power distribution network. Here, after the circuit power domain and the circuit's highest power level of metal are determined from the chips floor plan 100 in steps 801, 802 and 803, region metals of the next higher level are allocated by the checking program 806 and 807. For all region metals of the next higher level that are found overlapping the macro, the macro is considered a potential problem 808 if none has matching connectivity as the macro power pins. Its identified power pins are then checked for overlapping the macro pin extensions of the same metal level and same connectivity, and that these extensions have connections to the next higher level of metal in the vicinity of the macro and/or the region's boundary 809. If the last two criteria fail, both the macro and the corresponding region shapes are identified as errors 810, 811. The check repeats for each power domain found on highest metal of the circuit abstract 812.

Using existing connectivity data in the chip power grid and based on the technology metallurgy characteristics, the invention's checking algorithms can detect most types of real voltage region power shorts and opens without having to build a full logical representation of the complete full chip power metallurgy and power via structure as typically required by conventional full chip LVS and PGA checking processes.

For quick validation of macro related power connections inside voltage regions, the invention makes use of logical power net connectivity data already existing in the input chip floor plan. Macro power net connectivity data are automatically coded by a computer aided process that translates and imports the full chip logical description, usually coded in a hardware description language, into the graphical chip floor plan in the physical design database.

The software allows for a subset of its comprehensive checking capability to be used for very fast identification of flagrant voltage region interface problems. The fast algorithms streamline the checking by evaluating only a simplified or reduced number of metallurgy levels or a specific voltage domain, instead of evaluating the complete physical power structure.

The above described a set of physical design checking programs are applicable to checking a stand-alone chip power grid or to a chip power grid against an input chip floor plan.

This set of checking programs can analyze a routed chip power grid and identify real power shorts and opens that exist in voltage regions. These checks uncover problems that are typically due to an inconsistent interface defined between region and chip power distribution networks or between overlapping or nested voltage regions.

Others of the checking programs in the set are also available to validate region compositions in a chip floor plan. Here, voltage region power distribution networks in a routed chip power grid are checked against an input chip floor plan. These checks detect insufficient or incorrect interactions between the power image of the circuits placed inside voltage regions and the physical power distribution networks residing over the corresponding voltage regions. The checks validate the physical connections of the power distribution networks to the macro pins against the logical connectivity information that exist in the chip floor plan for all macro pins. These checks uncover problems that are typically due to floor planning or circuit abstract changes.

Both of the above types of checks use region shapes to identify the locations and areas of the associated physical power grid distribution networks in a full-chip power grid. Region shapes are non-manufacturing shapes used to represent voltage regions of independent power domains. These shapes are usually drawn directly in the input chip floor plan to encompass the intended region compositions. They can also be created in the chip power grid layout, or in an independent region specification cell view, whose area and coordinates are equivalent to that of the chip floor plan. All region shapes must be coded with power metallurgy routing properties to distinguish themselves as region shapes.

Using region power routing properties, which include the expected region power domains and the region metallurgy characteristics, as checking specifications, the invention provides quick checking algorithms to detect errors for applicable region metal layers against their expected interfaces.

As pointed out previously, the power connection checking algorithms use power net connectivity data that already exist in the chip power grid. Applicable region power metal levels are checked in succession against the metals above and/or below based on technology metallurgy characteristics.

All of the above checking algorithms can be limited to a certain power region of interest, a region metal layer, and/or a region domain type.

The program capabilities listed below are available for checking voltage region power distribution networks. These programs are intended to be executed against a stand-alone input chip power grid layout.

To detect shorts that exist in region power distribution networks, program capabilities are provided to find power stripes of the same metal level but of different power domains connecting with each other within a voltage region boundary. In general, these programs (1) find the relevant region power metals based on region shapes and their coded properties; (2) find overlapping of the identified region metals with other power metals in the chip power grid of the same level and the same connectivity; and (3) highlight all region metals that have overlapping metals of same metal but different connectivity as shorts.

A frequently used default programming checking mode for the above is to find shorts for all routing metals defined for the voltage region. Although the advanced algorithmic power routing technique typically guarantees no short for the routing metal hierarchy, execution errors may still result in conflicts between newly routed voltage region distribution networks versus an existing full-chip power grid.

A default quick programming checking mode for the above is to find shorts for the region's highest metals. This is because most common region power shorts are due to the interface between the region's highest metal and the next metal of its parent distribution network or of a nested or overlapping voltage region.

To detect opens that exist in region power distribution networks, program capabilities are provided to find region power stripes that have no connection to the expected next level of metal. The checking algorithms take into account that power domains may vary for each metal level. For instance, a complex multi-supply voltage region may have a higher level of metal supporting multiple voltage supplies while a lower level needs to support just one specific power domain. This is because connections to the higher metal for the lower level may be accomplished outside the region and still adequately address the power demand of connected circuits. In general, these programs (1) find relevant region power metals based on region properties; (2) identify those region metals that overlap with other metals of same connectivity but of the next level of metal; and (3) highlight all region power metals that do not have any such overlap as power opens.

A default quick programming checking mode above is to find all of the region's highest metals that do not overlap (i.e., connect) with any metal of the next higher level of the same connectivity. This is because the region's highest routing metal is typically required to have a direct interface with its parent physical power distribution network. The same power continuity check can be performed for a region's metal versus both the next higher and lower levels of metal. However, unless the region's metal-under-test is already the technology's top level of metal, for an advanced chip design with robust power routing technology, checking the region's highest power metal versus the next lower metal is usually not necessary.

Another default quick programming checking mode above is to identify an obviously missing power domain in the region's physical power grid. Using coded region properties, the checking program determines the expected domains for each region routing metal level. The program then quickly verifies for existence of all expected metal levels in the physical power distribution networks and their expected power domains based on the metal connectivity information. If an expected domain is missing from a routed metal level, the region is flagged as having power opens.

The program capabilities listed below are available for checking voltage region power connections versus region circuit compositions. These programs are intended for analyzing voltage region distribution networks that already exist in an input chip power grid layout against the region compositions found in an input chip floor plan. The chip floor plan contains circuit macro abstracts and power pin connectivity of all abstracts.

To detect shorts due to a circuit abstract having metal conflicts with a voltage region's power grid, program capabilities are provided to find power metals residing over voltage regions and shorting to either (1) a circuit abstract's pin of a different net connectivity, or (2) to a circuit abstract's metal blockage. These programs speed up the checking by first finding the relevant region power metals in the full-chip power grid, and then evaluating only those metals found overlapping with a pin shape or a metal blockage shape of the same metal level that exists in the floor plan hierarchy.

For shorting to a circuit abstract's pins, after finding the overlapping region's power metals with an abstract's pin shape, the checking algorithm (1) extracts the abstract pin's connectivity attribute in the chip floor plan; (2) compares the extracted attribute with that of the overlapping region's power metal; and (3) flags the region's power metal as a short if the compared connectivity attributes are not the same.

For shorting to a circuit abstract's blockage, the checking algorithm flags the region's power metals that overlap with the blockage shape as a short. This is because metal blockage shapes represent metal resources reserved for signal routing.

To detect the macro's power opens in voltage regions, quick checking program capabilities are provided to ensure minimum power connection between the macro's power pins and the region's power grid. The checking algorithms take into account that there are two methods of connecting a macro's power pins to its parent power grid: (1) Macro pins directly connecting to the next level of metal of same connectivity overlapping with the pins, and/or (2) Macro pins indirectly connecting to the next level of metal of same connectivity existing outside the macro boundary. The latter method makes the connection by first creating "macro pin extensions," which are power wires of the same metal level as the macro pins, and connecting the macro pins to the nearest region's next level of metal having the same power connectivity. In general, these checking programs: (1) find circuit abstracts residing in voltage regions; (2) find relevant power pins of each circuit abstract; (3) for each circuit's power domain, find next-higher metals of same power connectivity residing over this circuit boundary in the region; (4) if none found, check for macro power pin extension of same power connectivity and power metal level as the circuit's highest metal power pin; and (5) if none found, the circuit is flagged as having insufficient power connection.

The default quick programming checking mode for the above is to check only the highest metal power pins of the circuit abstracts. This is because the circuit's highest level of metal is typically required to have a direct interface with its parent distribution network, while the internal physical macro power grid is usually required to be error-free by the circuit's design methodology.

Another default quick programming checking mode for the above is to identify obviously invalid macro power domain types. Using coded region properties, the checking program determines the expected domains for each region. Using the chip floor plan, the program extracts power domains for all circuit macros placed within a voltage region. If a macro's power domain is not part of the region domains, the macro and the region are flagged as having power open.

The tools and algorithms implemented for this invention make use of region shapes and their annotated power routing properties coded in a graphical input cellview (e.g., the chip floor plan, the chip power grid, or an independent region specification cell view). However, the same information may also be obtained from a separate input file. Alternate programming data structures can also be defined to represent these region properties in the graphical physical design database.

The referenced annotated region properties usually represent power routing specifications. Usage of these properties can be further expanded by attaching more descriptive values to improve selective checking capabilities and performances.

Technology metallurgy structure, such as upper and/or lower metals associated with each metal-under-test, is updateable for use by all existing checking algorithms. This capability is to support reuse of program capabilities in any new metal technology.

The described checking toolset is constructed to allow additions of other voltage-island integrity checks such as (1) desired ratio for routing multi-domain power regions (e.g., 3 VIO to every 1 VDD wiring track on a certain high metal layer, but only VDD for all lower metals) depending on the region composition; (2) maximum recommended distance of a custom macro to be placed inside a voltage region to the nearest corresponding power IO-pad; (3) desired ratio of certain power IO-pads within a region boundary; or (4) maximum allowed vicinity of power connections for a macro placed within a region to the next level of metal outside a voltage region.

The scope of this discussion is limited to validating only the physical implementation of voltage region power grid designs. However, other electrical power checking guidelines (e.g., electromigration or voltage-drop limits) can also be added as power integrity checking criteria. These guidelines can be coded on region shapes and be applicable to all circuits placed within, or they can be coded for specific circuits placed inside regions. For example, a circuit macro's power or current estimate can be coded for the macro and be checked against a recommended distance to nearest relevant power IO-pad, or to the nearest power of a certain high-metal (e.g., metal-9, which directly connects to the IO-pad's metal-10) to ensure good power distribution from the corresponding IO-pad to the circuit-under-test.

The cost and time savings in the overall design cycle were accomplished by (1) enabling checking of voltage region distribution networks independently, and by (2) using early chip floor plan and power grid connectivity data. Since voltage region design problems are identified much earlier using this invention, power regions and/or their macro placements can be fine-tuned or corrected much sooner than possible with the conventional full-chip physical design checks. Full-chip physical design checks require more complete circuit design data. These are typically very time- and memory-consuming processes. They also require extra analysis to isolate voltage region design problems from reported errors. Also, in design environments where full chip checking capability of multi-voltage chip designs are still limited, the invention helps preventing flagrant voltage region power connection problems from being deployed in actual hardware.

Because macro abstract information is used instead of actual circuit layouts, and power grid connectivity and metallurgy characteristics are used instead of building the complete chip power metallurgy and power via structure, the invention flags power grid and macro-related power shorts and opens that exist in voltage regions much faster and more comprehensively than existing LVS-continuity (LVSC) based checks.

For power shorts, the invention is able to identify all problems for any metal level associated with a voltage region. Alternately, the invention also identifies all at once all the circuits in a voltage region that have either power domain or metal conflicts with the region or the chip power grid. This checking capability is a major time-saving for detecting power shorts versus conventional LVSC-based checks, which detect only one short at a time and require additional analysis to isolate the actual source of problems.

The invention is applicable to a specific power region, a region metal layer, and/or a region domain type. Checking algorithms are readily re-usable for a chip design with a newer metal technology. This is achievable by simply updating the metallurgy structure characteristics (i.e., the upper and lower metals associated with a metal-under-test) corresponding to the newer technology.

In controlled EC design mode, the invention identifies any new voltage region power grid problem that may surface due to a placement or abstract change. This helps to determine the magnitude of the change required to correct the problems with minimum effort.

The present invention is implemented by a computer. It contains software that validates physical voltage region power distribution networks to be built in hardware as part of a full chip power grid layout. The software can be contained on media usable by the computer such as tangible, optical and magnetic media.

There may be many variations to the diagrams and the steps (or operations) described herein without departing from the spirit of the invention. For instance, the steps may be performed in a different order, or steps may be added, deleted or modified. All of these variations are considered a part of the claimed invention. Therefore while the preferred embodiment to the invention has been described, it will be understood that those skilled in the art, both now and in the future, may make various improvements and enhancements that fall within the scope of the claims that follow.

What is claimed is:

1. An improved method for validating a physical implementation of voltage region power distribution networks in a semiconductor chip design comprising the steps of:
   performing a plurality of early chip design steps resulting in an early semiconductor chip design including an initial chip floor plan and a chip power grid layout;
   performing a series of early power grid validity checks on the power distribution networks after the early chip design steps by:
      using routing properties coded on region shapes for quick identification of voltage regions and their expected power metallurgy characteristics,
      analyzing region power distribution networks against the chip floor plan, which contains circuit abstracts rather than real circuit layouts, and
      using coded connectivity attributes already existing in the chip power grid layout and the chip floor plan, eliminating a need to build a full logical representation of a complete power metallurgy and via structure as required by conventional chip physical design checking methods;
   performing a series of post early power grid validity checks on aspects of the chip design other than power distribution networks, including chip signal routing steps; and
   performing full-chip formal and physical design verification and analysis procedures after completion of all mentioned steps and checks;
   wherein one or more of the method steps are performed by a computer.

2. The method of claim 1, wherein the step of performing a series of early power grid validity checks includes the steps of:
   checking that all routed region power distribution networks are connected to their parent power distribution networks;
   checking that all region power distribution networks have no metal power short;
   checking that all circuits placed inside regions are connected to the circuits' parent power distribution networks; and
   checking that all circuits placed inside regions are free of metal power shorts.

3. The method of claim 2, wherein the step of performing a series of early power grid validity checks uses information from:
   the chip power grid layout containing routed voltage region distribution networks with connectivity information already existing for all power metals; and
   region shapes annotated with region power metallurgy properties, which include expected metal levels and power domains for each metal level.

4. The method of claim 2, wherein the step of checking that all routed region power distribution networks are connected to their parent power distribution networks includes the steps of:
  using coded region properties to identify voltage region locations and their expected routing metal levels and power domains; and
  identifying region power metals and finding overlapping metals of a next higher level of metal and of same connectivity.

5. The method of claim 2, wherein the step of checking that all circuits placed inside regions are connected to the circuits' parent power distribution networks includes the steps of:
  using annotated routing metal layers of region shapes to determine a highest metal level expected to be assigned by power routing process for region power distribution networks; and
  checking identified highest metal level of each region power distribution network for continuity with the next higher level of metal in the chip power grid layout.

6. The method of claim 2, wherein the step of checking that all region power distribution networks have no metal power short includes the steps of:
  using coded region properties to identify voltage region locations and their expected routing metal levels and power domains; and
  identifying region power metals and finding overlapping metals of a same metal level with different connections.

7. The method of claim 2, wherein the step of checking that all circuits placed inside regions are connected to the circuits' parent power distribution networks uses:
  the chip floor plan containing circuit abstracts and net connectivity for all abstracts' power pins.

8. The method of claim 2, wherein the step of checking that all circuits placed inside regions are connected to the circuits' parent distribution networks includes the steps of:
  using region properties to identify region shapes, their locations, expected power domains, and metallurgy characteristics;
  using the chip floor plan to find all circuit abstracts placed inside identified regions;
  using circuit abstracts to identify macros' highest power metal level;
  using logical power connectivity information in the chip floor plan to determine expected macro power domains;
  checking identified macro power domains against their region domains; and
  checking a macro abstract's highest power metals for physical connection to a same or to a next higher level of metal of an associated region power distribution network.

9. The method of claim 2, wherein the step of checking that all circuits placed inside regions are free of metal power shorts includes the steps of:
  using region properties to identify region shapes, their locations, expected power domains, and metallurgy characteristics;
  using the chip floor plan to find all circuit abstracts placed inside identified regions;
  using circuit abstracts to determine circuit power pin and blockages;
  using the chip floor plan to determine power connectivity of circuit abstracts' power pins;
  checking for shorts between circuit abstracts' metal blockages and their parent power distribution networks by finding power metals that overlap with circuit abstracts' blockage shapes on a same level of metal; and
  checking for shorts between circuit abstracts' pins and their parent power distribution networks by finding power metals that overlap with circuit abstracts' pin shapes of same metal level but of different connectivity.

10. The method of claim 1, wherein use of the method is limited to one or more of a specific power region of interest, a region metal level, and a region's power domain type.

11. A computer program product having a program embodied on a non-transitory computer usable medium which, when executed by a computer, causes the computer to implement an improved method for validating a physical implementation of multi-voltage region power distribution networks in a semiconductor chip design, comprising:
  code for performing a plurality of early chip design steps resulting in an early semiconductor chip design including an initial chip floor plan and a chip power grid layout;
  code for performing a series of early power grid validity checks on the power distribution networks after the early chip design steps by:
    using routing properties coded on region shapes for quick identification of voltage regions and their expected power metallurgy characteristics,
    analyzing region power distribution networks against the chip floor plan, which contains circuit abstracts rather than real circuit layouts, and
    using coded connectivity attributes already existing in the chip power grid layout and the chip floor plan, eliminating a need to build a full logical representation of a complete power metallurgy and via structure as required by conventional chip physical design checking methods;
  code for performing a series of post early power grid validity checks on aspects of the chip design other than power distribution networks, including chip signal routing steps; and
  code for performing full-chip formal and physical design verification and analysis procedures after completion of all mentioned steps and checks.

12. The computer program product of claim 11, wherein the code for performing a series of early power grid validity checks includes:
  code for checking that all routed region power distribution networks are connected to their parent power distribution networks;
  code for checking that all region power distribution networks have no metal power short;
  code for checking that all circuits placed inside regions are connected to the circuits' parent power distribution networks; and
  code for checking that all circuits placed inside regions are free of metal power shorts.

13. The computer program product of claim 12, wherein the code for performing a series of early power grid validity checks uses information from:
  the chip power grid layout containing routed voltage region distribution networks with connectivity information already existing for all power metals; and
  region shapes annotated with region power metallurgy properties, which include expected metal levels and power domains for each metal level.

14. The computer program product of claim 12, wherein the code for checking that all routed region power distribution networks are connected to their parent power distribution networks includes:

code for using coded region properties to identify voltage region locations and their expected routing metal levels and power domains; and code for identifying region power metals and finding overlapping metals of a next higher level of metal and of same connectivity.

15. The computer program product of claim 12, wherein the code for checking that all circuits placed inside regions are connected to the circuits' parent power distribution networks includes:

code for using annotated routing metal layers of region shapes to determine a highest metal level expected to be assigned by power routing process for region power distribution networks; and code for checking identified highest metal level of each region power distribution network for continuity with the next higher level of metal in the power grid layout.

16. The computer program product of claim 12, wherein the code for checking that all region power distribution networks have no metal power short includes code for:

code for using coded region properties to identify voltage region locations and their expected routing metal levels and power domains; and code for identifying region power metals and finding overlapping metals of a same metal level with different connections.

17. The computer program product of claim 12, wherein the code for checking that all circuits placed inside regions are connected to the circuits' parent power distribution networks uses:

the chip floor plan containing circuit abstracts and net connectivity for all abstracts' power pins.

18. The computer program product of claim 12, wherein the code for checking that all circuits placed inside regions are connected to the circuits' parent power distribution networks includes:

code for using region properties to identify region shapes, their locations, expected power domains, and metallurgy characteristics;

code for using the chip floor plan to find all circuit abstracts placed inside identified regions;

code for using circuit abstracts to identify macros highest power metal level; code for using logical power connectivity information in the chip floor plan to determine expected macro power domains;

code for checking identified macro power domains against their region domains; and code for checking a macro abstract's highest power metals for physical connection to a same or to a next higher level of metal of an associated region power distribution network.

19. The computer program product of claim 12, wherein the code for checking that all circuits placed inside regions are free of metal power shorts includes:

code for using region properties to identify region shapes, their locations, expected power domains, and metallurgy characteristics;

code for using the chip floor plan to find all circuit abstracts placed inside identified regions;

code for using circuit abstracts to determine circuit power pin and blockages;

code for using the chip floor plan to determine power connectivity of circuit abstracts' power pins;

code for checking for shorts between circuit abstracts' metal blockages and their parent power distribution networks by finding power metals that overlap with circuit abstracts' blockage shapes on a same level of metal; and code for checking for shorts between circuit abstracts' pins and their parent power distribution networks by finding power metals that overlap with circuit abstracts' pin shapes of same metal level but of different connectivity.

20. The computer program product of claim 11, wherein use of the method is limited to one or more of a specific power region of interest, a region metal level, and a region's power domain type in a multisupply voltage chip design.

* * * * *